United States Patent
Przybyla et al.

(10) Patent No.: US 10,901,064 B2
(45) Date of Patent: Jan. 26, 2021

(54) ULTRASONIC BEACON TRACKING

(71) Applicant: Chirp Microsystems, Inc., Berkeley, CA (US)

(72) Inventors: Richard J. Przybyla, Emeryville, CA (US); Ryan Young, El Cerrito, CA (US); Mitchell H. Kline, Alameda, CA (US); David A. Horsley, Berkeley, CA (US)

(73) Assignee: CHIRP MICROSYSTEMS, INC., Berkeley, CA (US)

( * ) Notice: Subject to any disclaimer, the term of this patent is extended or adjusted under 35 U.S.C. 154(b) by 911 days.

(21) Appl. No.: 15/354,892

(22) Filed: Nov. 17, 2016

(65) Prior Publication Data

US 2017/0343637 A1    Nov. 30, 2017

Related U.S. Application Data

(63) Continuation of application No. PCT/US2016/034176, filed on May 25, 2016.

(51) Int. Cl.
*G01S 3/808* (2006.01)
*G01S 5/30* (2006.01)
*G01S 15/87* (2006.01)

(52) U.S. Cl.
CPC .............. *G01S 3/808* (2013.01); *G01S 5/30* (2013.01); *G01S 15/876* (2013.01)

(58) Field of Classification Search
CPC ........... G01S 3/808; G01S 15/876; G01S 5/30
See application file for complete search history.

(56) References Cited

U.S. PATENT DOCUMENTS

| | | | | | |
|---|---|---|---|---|---|
| 2,724,816 | A | * | 11/1955 | Goodell | G01S 7/527 367/115 |
| 4,649,385 | A | * | 3/1987 | Aires | G07C 9/28 379/56.3 |
| 6,317,386 | B1 | * | 11/2001 | Ward | G01S 5/186 367/127 |

(Continued)

OTHER PUBLICATIONS

Peng, BeepBeep: A High-Accuracy Acoustic-Based System for Ranging and Localization Using COTS Devices; Mar. 2012 (Year: 2012).*

(Continued)

*Primary Examiner* — Hovhannes Baghdasaryan
*Assistant Examiner* — Amie M Ndure
(74) *Attorney, Agent, or Firm* — JDI Patent; Joshua D. Isenberg; Robert Pullman

(57) ABSTRACT

Time of flight between two or more ultrasonic transceivers is measured using known delays between receiving a trigger and sending an ultrasonic pulse in reply. A receive time is measured from a beginning of a receive phase in which the pulse is detected until receipt of an ultrasonic reply pulse. A trip time is determined from a sum of the receive time and a difference between a known first reference period for a transceiver that sends the trigger pulse and a second know reference period for a second transceiver that sends the reply pulse. The second reference period corresponds to a delay between when the second transceiver receives the initial or subsequent trigger pulse from the first transceiver and when the second transceiver sends the reply pulse.

14 Claims, 8 Drawing Sheets

(56) References Cited

U.S. PATENT DOCUMENTS

| | | | |
|---|---|---|---|
| 6,493,649 B1* | 12/2002 | Jones | G01S 5/186 367/99 |
| 2003/0142587 A1 | 7/2003 | Zeitzew | |
| 2004/0183661 A1* | 9/2004 | Bowman | G08G 1/165 340/435 |
| 2008/0231498 A1 | 9/2008 | Menzer et al. | |
| 2008/0259732 A1 | 10/2008 | Booij et al. | |
| 2009/0070797 A1* | 3/2009 | Ramaswamy | H04W 4/029 725/10 |
| 2011/0222528 A1* | 9/2011 | Chen | G01S 5/18 370/350 |
| 2012/0177265 A1* | 7/2012 | Yoshiara | A61B 8/06 382/128 |
| 2014/0160893 A1* | 6/2014 | Amm | H04M 1/2155 367/118 |

OTHER PUBLICATIONS

International Search Report for PCT/US2016/034176 dated Sep. 1, 2016.
Styger.Eric, Tutorial-Ultrasonic Ranging with the Freedom Board, MCU on Eclipse, Jan. 1, 2013, pp. 16-17, [online], [retrieved on Mar. 8, 2016] Retrieved from the Internet ,url:https//mcuoneclipse.com/2013/01/01/tutorial-ultrasonic-ranging-with-the-freedom-board/>.
Partial European Search Report dated Jan. 7, 2020 for European Patent Application No. EP16903325.
European Supplementary Search Report dated Jun. 25, 2020 for Application EP 16903325.5.

* cited by examiner

ULTRASONIC BEACON TRACKING

CLAIM OF PRIORITY

This application is a continuation of International Patent Application Number PCT/US2016/034176 filed May 25, 2016, the entire contents of which are incorporated herein by reference in their entirety.

STATEMENT REGARDING FEDERALLY SPONSORED RESEARCH OR DEVELOPMENT

This invention was made with Government support under IIP-1456376 awarded by the National Science Foundation. The Government has certain rights in this invention. 45 CFR 650.4(f)(4)

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

Localization techniques are used to determine the location of an object relative to a known reference frame such as the Earth or relative to a second object which is stationary in the desired reference frame. Various techniques can be used, including radio frequency ranging, camera tracking, and inertial dead reckoning. Radio frequency techniques are not suitable to short range, indoor tracking applications. Camera techniques are expensive and costly. Inertial dead reckoning techniques are susceptible to offset drift and other errors and generally have low performance.

It is within this context that aspects of the present disclosure arise.

SUMMARY

An ultrasonic beacon tracking approach is proposed to address these shortcomings in the state of the art. This disclosure relates generally to ultrasonic pulse-echo beacon tracking and specifically to a system and a method to measure the position of a transceiver relative to the position of one or more other transceivers.

DETAILED DESCRIPTION

A system to measure the time of flight between two or more transceivers is disclosed. The current disclosure teaches how to track an ultrasonic transceiver using one or more other ultrasonic transceivers to measure ultrasonic delay between the transceivers. It is noted that at least one of the transceivers, e.g., the one referred to herein as a base station, may be configured to transmit pulses by a mechanism other than ultrasound (e.g., electromagnetic or optical radiation) and still receive ultrasonic pulses and the other transceiver, e.g., the one referred to herein as an ultrasonic beacon, may be configured to correspondingly receive pulses by the mechanism other than ultrasound.

Figure 1:
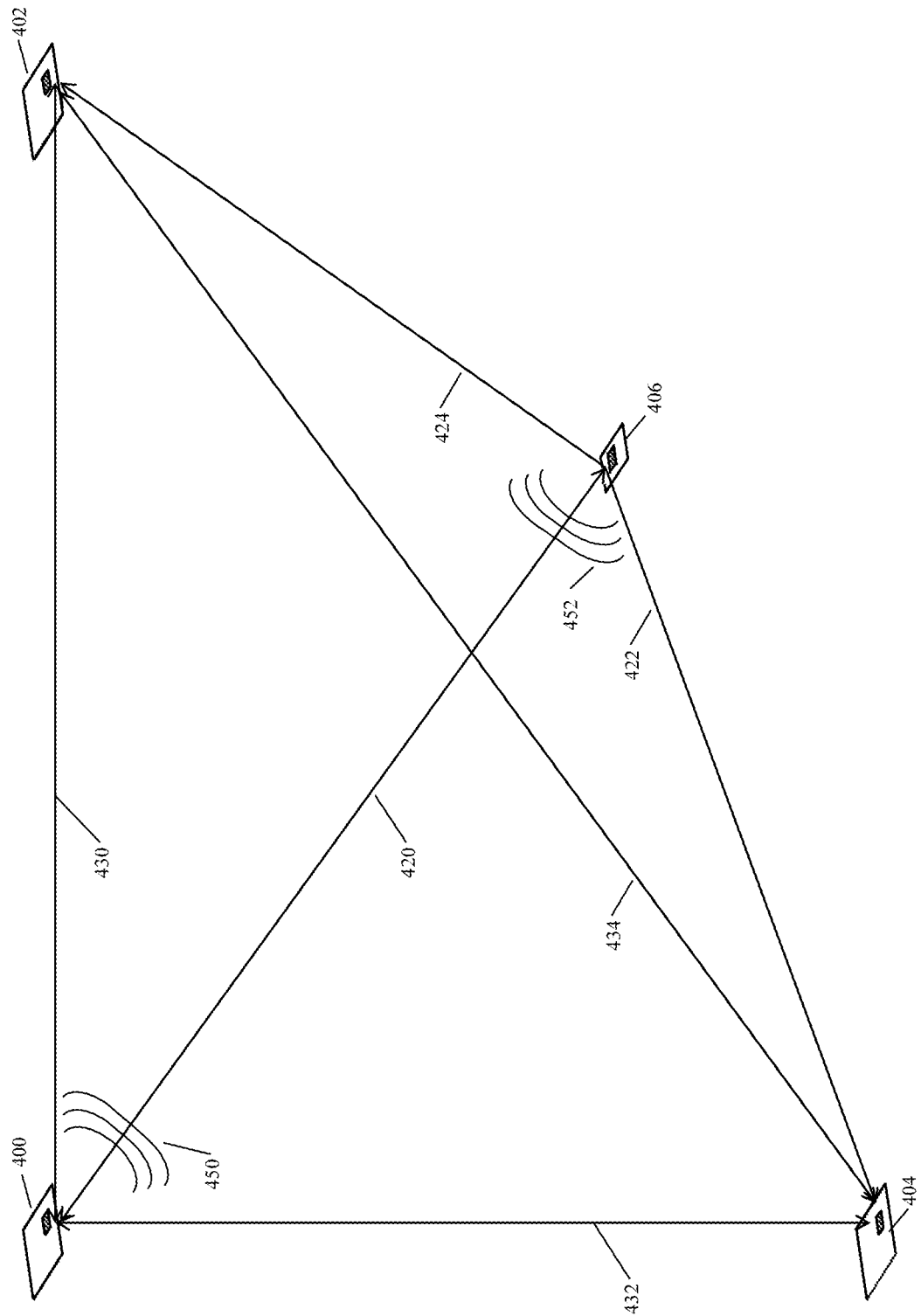
FIG. 1 shows a schematic diagram of three ultrasonic transceivers tracking a fourth ultrasonic transceiver.

FIG. 1 shows a schematic diagram of three base station ultrasonic transceivers 400, 402, 404 tracking a fourth ultrasonic beacon 406. In some embodiments, additional ultrasonic beacon(s) 407 may be present. In one embodiment, the positions of ultrasonic base stations 400, 402, 404 are known. At the start of a measurement, ultrasonic base station 400 transmits ultrasonic pulse 450 and then begins receiving, and triggers ultrasonic transceivers 402, 404 to begin receiving after a reference time delay $T_D$ has elapsed. The base station 400 may trigger ultrasonic transceivers 402, 404 electronically through use of trigger pins on each transceiver. Each transceiver may have a trigger pin which may be configured to cause the start of a measurement on the transceiver upon receipt of a valid trigger signal, or may be configured to create trigger signals which will trigger other units or a central controller. The trigger pin may be reconfigurable as a general purpose input output pin. Ultrasonic beacon 406 receives ultrasonic pulse 450 after a time delay corresponding to the length of path 420 divided by the speed of sound. Ultrasonic beacon 406 waits until the reference time delay $T_D$ has elapsed and then transmits ultrasonic pulse 452, which is received by ultrasonic base station 400 with a perceived time delay of twice the length of path 420 divided by the speed of sound from when ultrasonic base station 400 began receiving. Ultrasonic base station 402 measures a time delay equal to the sum of the length of path 420 and the length of path 424 divided by the speed of sound. Similarly, ultrasonic base station 404 measures a time delay equal to the sum of the length of path 420 and the length of path 422 divided by the speed of sound. The position of ultrasonic beacon 406 may then be calculated from the positions of ultrasonic base stations 400, 402, 404, the three measured times of flight, and the speed of sound.

Figure 2:
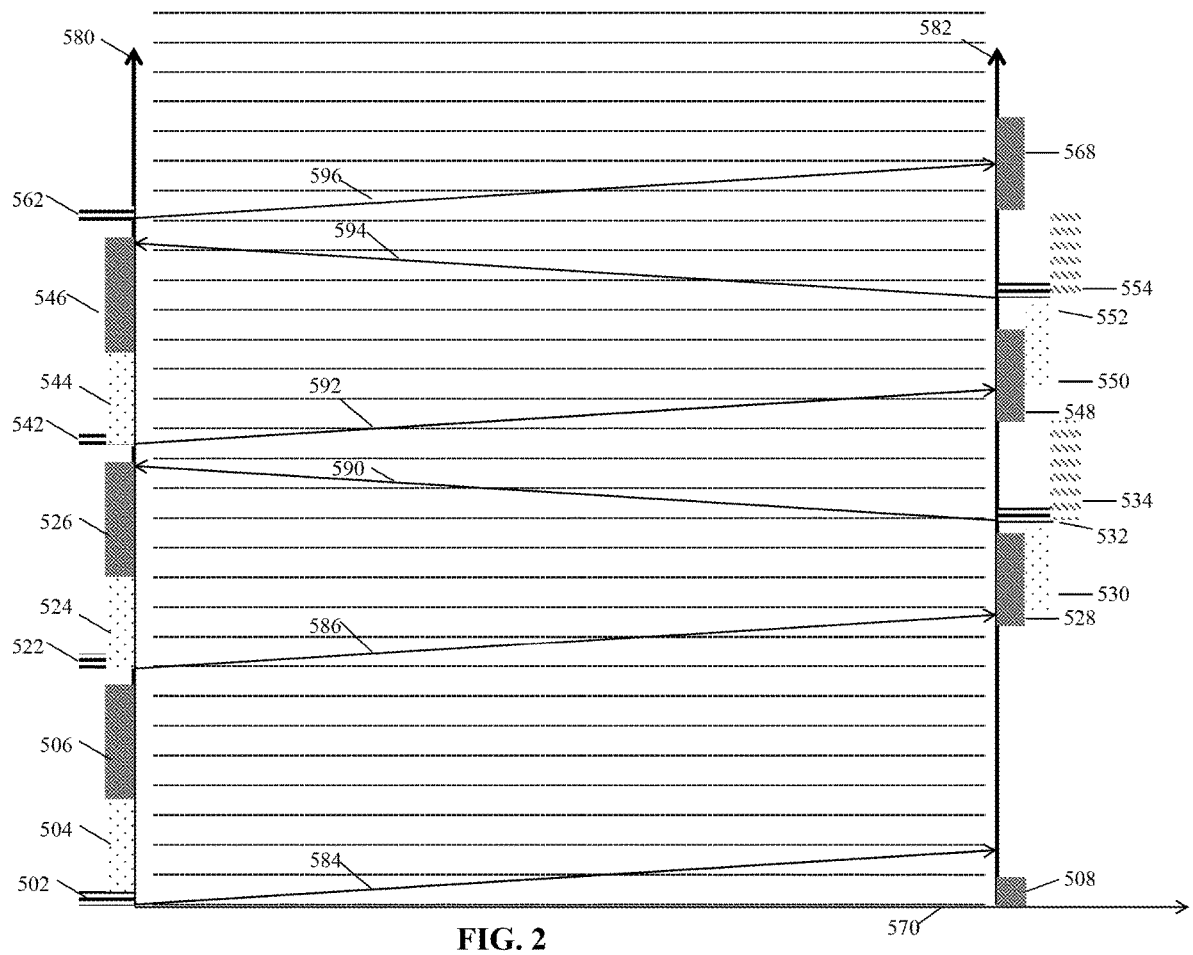
FIG. 2 shows a timing diagram, illustrating the relative timing of a first ultrasonic transceiver and a second ultrasonic transceiver, when operated in a first operating mode.

Further detail is provided regarding the synchronization of the ultrasonic base station 400 and the ultrasonic transceiver beacon 406. Refer to FIG. 2. A timing diagram is shown. Time axis 580 represents the time in the reference frame of ultrasonic base station 400. Range axis 570 shows the range between base station 400 and ultrasonic beacon 406. Ultrasonic beacon position trace 582 represents the position of the ultrasonic beacon 406 relative to ultrasonic base station 400. The spacing between time axis 580 and ultrasonic beacon position 582 represents the distance between ultrasonic base station 400 and ultrasonic beacon 406.

In this example, at the beginning of the timing diagram, ultrasonic base station 400 and ultrasonic beacon 406 are not synchronized. Ultrasonic base station 400 emits a first transmission in the form of an ultrasonic trigger pulse 502 which travels 584 to ultrasonic beacon 406. Meanwhile, ultrasonic beacon 406 concludes a first receiving phase 508 before ultrasonic trigger pulse 502 arrives, and ultrasonic beacon 406 does not detect trigger pulse 502. Ultrasonic base station 400 waits for a reference delay 504 and begins a first receiving phase 506, during which it does not receive a reply from ultrasonic beacon 406.

In the case that ultrasonic beacon 406 is not synchronized and does not detect a pulse, ultrasonic beacon 406 waits for a predetermined period after the beginning of first receive phase 508 before starting a second receive phase 528. The predetermined period may be chosen such that ultrasonic beacon 406 has a reliably different period than ultrasonic base station 400 such that the ultrasonic beacon 406 will eventually hear the transmission from ultrasonic base station 400 despite arbitrary initial timing conditions. As an example, if ultrasonic base station 400 is configured to transmit every 100 ms, ultrasonic beacon 406 may be configured to receive every 90 ms.

The next measurement is initiated by ultrasonic base station 400 when it emits a second transmission 522 after one measurement period has elapsed since the beginning of first transmission 502. In this example, after delay 586 ultrasonic beacon 406 detects second transmission 522 during the second receive phase 528. Ultrasonic beacon 406 generates a reference delay 530 after reception of second transmission 522 and then generates a first reply transmission 532. After delay 590 ultrasonic base station 400 receives reply transmission 532 during the second receive phase 526. Reference time delay 530 and reference time delay 524 may be in the range of 0 to 100 ms, and more specifically in the range of 2 ms to 20 ms. The time between the start of second receive phase 526 and the arrival of reply transmission 532 is equal to the round trip time of flight between ultrasonic base station 400 and ultrasonic beacon 406 plus the difference of reference time delay 530 and reference time delay 524 plus the difference of any timing errors introduced by ultrasonic beacon 406 and ultrasonic base station 400. The estimate of the round trip time of flight can be used together with the speed of sound to estimate the range between ultrasonic beacon 406 and ultrasonic base station 400.

After ultrasonic beacon 406 sends reply transmission 532, it waits a variable time delay 534. A desired feature is that transmissions 502, 522, 542, 562 should arrive at the center of receive phases 508, 528, 548, 568 in order to minimize the probability of missed transmissions due to incorrect receive phase timing. If ultrasonic beacon 406 is moving with respect to ultrasonic base station 400, the arrival time of transmissions 502, 522, 542, 562 is variable. Furthermore, the clocks on ultrasonic base station 400 and beacon 406 may have frequency errors or drift which contributes to inaccurate timing of the receive phases. For this reason, a delay-locked feedback loop may be used to ensure that base station 400 and beacon 406 operate with the same period and to ensure that receive phases 508, 528, 548, 568 coincide with the arrival times of transmissions 502, 522, 542, 562.

In one embodiment, a fixed delay based on the predetermined period of base station 400 is added to an error signal equal to the difference of the arrival of time of transmission 522 and the center of receive phase 528 to create a variable time delay 534 such that the subsequent transmission 542 should arrive at the center of receive phase 548. This process is repeated for each receive phase, forming a delay-locked feedback loop which acts to lock the center of the receive phase to the arrival time of the transmission. As shown by example in FIG. 2, transmission 522 arrives after a delay 586 that is before the mid-point of receive phase 528. As a result, variable time delay 534 is adjusted to be longer such that transmission 542 arrives closer to the mid-point of receive phase 548. For example, the equation used to update the variable time delay 534 may be:

$$T_{VTD} = T_{FIXED} + T_{ARRIVAL} - T_{RECEIVE}/2$$

In equation 0022, $T_{VTD}$ is variable time delay 534, $T_{FIXED}$ is a predetermined time delay, $T_{ARRIVAL}$ is the time between the beginning of a receive phase on beacon 406 and the arrival of the transmission from base station 400, and $T_{RECEIVE}$ is the duration of the receive phase.

The delay-locked feedback loop acts to measure the error between the predetermined period of the base station and the period of the beacon and to drive this error to zero. Since the adjustment of the variable time delay 534 affects all subsequent measurements, the error signal is in effect integrated by the delay-locked feedback loop, forming a first-order integrator loop which cancels the error within the delay resolution of the variable time delay 534. As in any feedback controller, higher order control loops which contain proportional, integral, or derivative paths could be used. It is noted that for implementations in which the beacon is moving, the delay-lock loop parameters (including the duration of the receive phase) may be configured to ensure that the receive signal doesn't drop out due to rapid changes in the path length between the ultrasonic beacon 406 and the base station 400, e.g., based on an assumed maximum velocity of the beacon relative to the base station.

After the ultrasonic base station 400 and the ultrasonic beacon 406 are synchronized, the beacon may decrease the length of receive period 568 and subsequent receive periods such that the length of receive period 568 is equal to twice the maximum expected relative velocity between the beacon 406 and base station 400 multiplied by the measurement period divided by the speed of sound. This may act to reduce average power consumption of the system by reducing the duty cycle of the receiver.

During or after synchronization, ultrasonic base station 400 may send transmissions 522, 542, 562 with data contained within the ultrasonic pulse. These transmissions may consist of multiple symbols, where each symbol may have an arbitrary phase or amplitude. The data may be encoded in the amplitude and phase of the symbol or in the amplitude and phase of the complex difference of subsequent symbols. The data may be used to transmit configuration settings from the ultrasonic base station 400 to the ultrasonic beacon 406. For example, the ultrasonic base station 400 may transmit data to ultrasonic beacon 406 which indicates the duration of reference time delay 530 or which indicates the measurement period. Ultrasonic beacon 406 may also transmit data during transmissions 532, 552. This data may be used, for example, to indicate to ultrasonic base station 400 the strength of the received signal.

In some embodiments, ultrasonic beacon 406 may transmit 532 data to ultrasonic base station 400 to indicate an error in the generation of the preceding reference delay 530.

Ultrasonic base station 400 may use this data to correct the measurement of the time of arrival of transmission 532 and thus to improve the accuracy of the estimate of the time-of-flight. Ultrasonic beacon 406 may also transmit identifying data such as a serial number or an encryption key, or data about a system to which ultrasonic beacon 406 is attached, such as battery state, sensor data, or user input data. In some implementations, the beacon 406 may also transmit data corresponding to an identifier for a device or object containing the beacon, such as a left or right game controller, user name, manufacturer ID, etc.

Further detail is now provided regarding the generation of time delays. In many systems, a crystal oscillator or other high precision timing reference is used to create a precise, known clock frequency. This clock can be counted to create arbitrary time delays with a resolution equal to the clock's period. In order to measure time-of-flight with high precision, a high precision oscillator is required.

Figure 3:
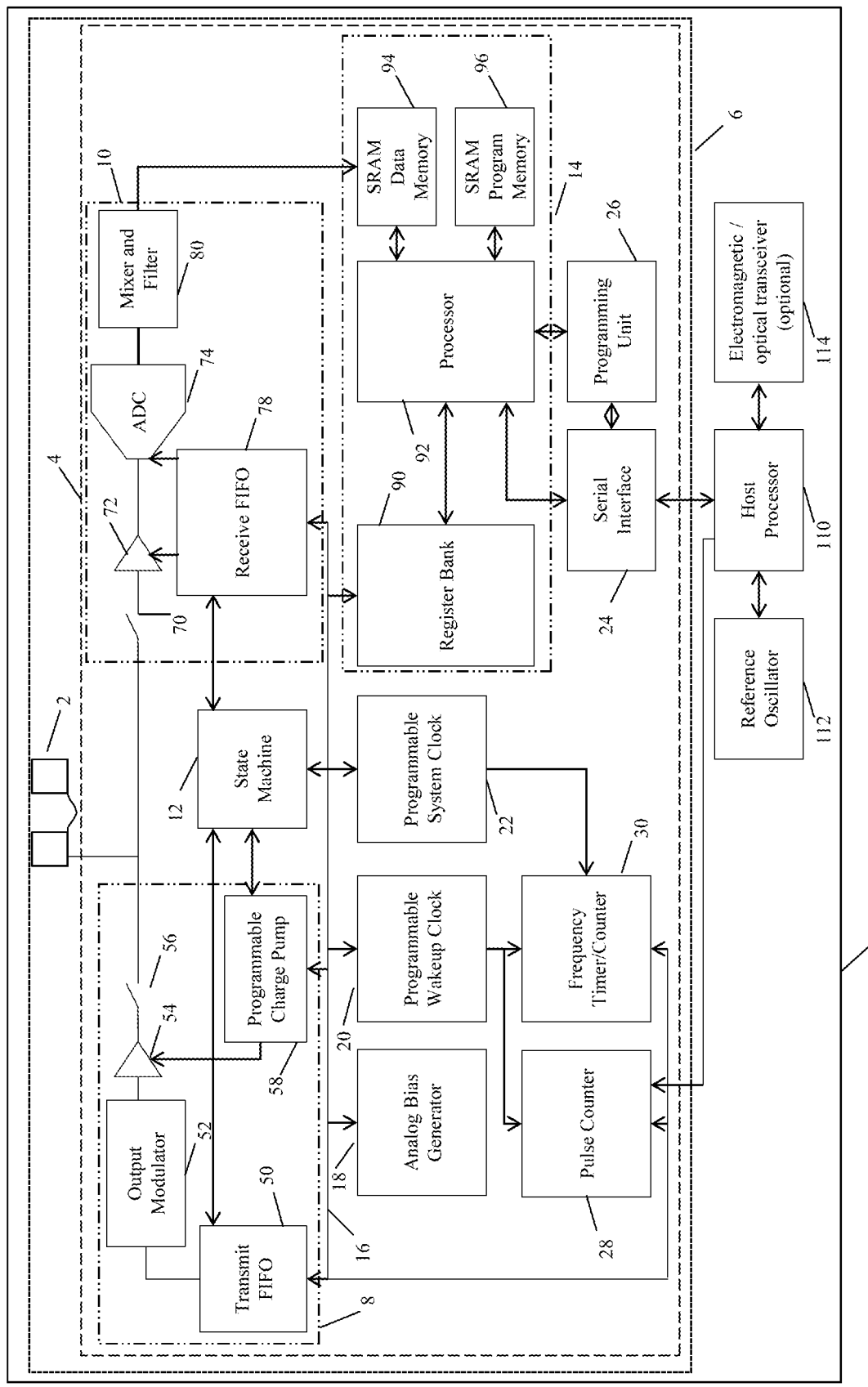
FIG. 3 shows a block diagram of an ultrasonic beacon.

Refer now to FIG. 3. Ultrasonic transceiver 6 contains an ultrasonic transducer 2 which is controlled by electrical circuit 4. Electrical circuit 4 contains a transmitter module 8 and a receive module 10 which are controlled by a state machine 12. A digital controller 14 controls the state machine 12, a programmable wake-up clock 20, a programmable system clock 22, a pulse counter 28, and a frequency timer/counter 30. Digital controller 14 interfaces with a programming unit 26 which is used to program digital controller's program memory 96. Serial interface 24 is used by digital controller 14 to communicate with host processor 110. Host processor 110 can use a reference oscillator 112 to generate accurate time delays. In some implementations, the transceiver 6 may optionally include an electromagnetic/optical transceiver 114 coupled to the host processor 110 to implement additional channels of communication for trigger pulses or synchronization signals and other information to other similarly configured transceivers.

In one embodiment, a high precision reference oscillator 112 is used to calibrate a low precision wake-up clock 20. Host processor 110 uses serial interface 24 to signal digital controller 14 to configure pulse counter 28 and programmable wake-up clock 20 to begin a calibration state. Host processor 110 uses reference oscillator 112 to create a reference pulse which triggers pulse counter 28. Pulse counter 28 counts the clock cycles of programmable wake-up clock 20 which occur during the reference pulse and stores this count as a calibration result. For example, if the reference pulse is 100 ms long, and programmable wake-up clock has a frequency of 10 kHz, the pulse counter will contain a calibration result count of 1000 at the end of the reference pulse.

Following the conclusion of the calibration procedure, host processor 110 can query the result of the calibration using serial interface 24 to communicate with digital controller 14. Ultrasonic transceiver 6 can also use the result stored in pulse counter 28 to generate accurate delays. In order to generate an accurate delay, ultrasonic transceiver 6 loads the calibration result in pulse counter 28 into programmable wakeup clock 20. Programmable wakeup clock 20 will now wake-up with a period approximately equal to that of the reference pulse generated by host processor 110 and reference oscillator 112. In order to generate delays of different lengths, digital controller 14 may multiply, bitshift, or add to the original calibration result before loading the modified result into programmable wake-up clock 20.

In an embodiment, programmable system clock 22 may be used in addition to programmable wake-up clock 20 to generate a high precision delay such as reference delay 530. In this embodiment, the delay to be implemented is required to be an integer multiple of the period of programmable wake-up clock 20. Programmable system clock 22 is a high frequency oscillator. In some implementations programmable system clock 22 may be a voltage controlled oscillator or a digitally controlled oscillator. In general, the actual period of programmable system clock 22 may be unknown. In order to determine the period of programmable system clock 22, frequency timer/counter 30 is used to count a number of cycles of programmable wake-up clock 20. The number of cycles of programmable wake-up clock 20 to count may be chosen to be equal to the calibration result from pulse counter 28 or a divided or multiplied version of this calibration result. The frequency timer/counter 30 counts the number of programmable system clock 22 cycles which fall during the counts of the programmable wake-up clock 22. The resultant frequency count allows the period of the programmable system clock 20 to be determined. It also determines the ratio of the programmable system clock 20 to the programmable wake-up clock 22.

In one embodiment, ultrasonic beacon 406 may generate reference delay 530 to start from the beginning of receive cycle 528 and last an amount of time equal to a fixed reference delay and the difference between the start of receive cycle 528 and the arrival of transmit pulse 522 (hereafter time of arrival). In this case, ultrasonic beacon 406 may measure the time of arrival in counts of programmable system clock 22. To generate reference delay 530 ultrasonic beacon 406 may use the frequency count from the frequency/timer counter 30 to convert the time of arrival from counts of programmable system clock 22 to counts of programmable wake-up clock 20 with a remainder in counts of programmable system clock 22. Then, in order to generate reference delay 530, the programmable wake-up clock 20 is used to generate a coarse delay, and the programmable system clock 22 is used to generate the remaining fine delay.

Figure 4:
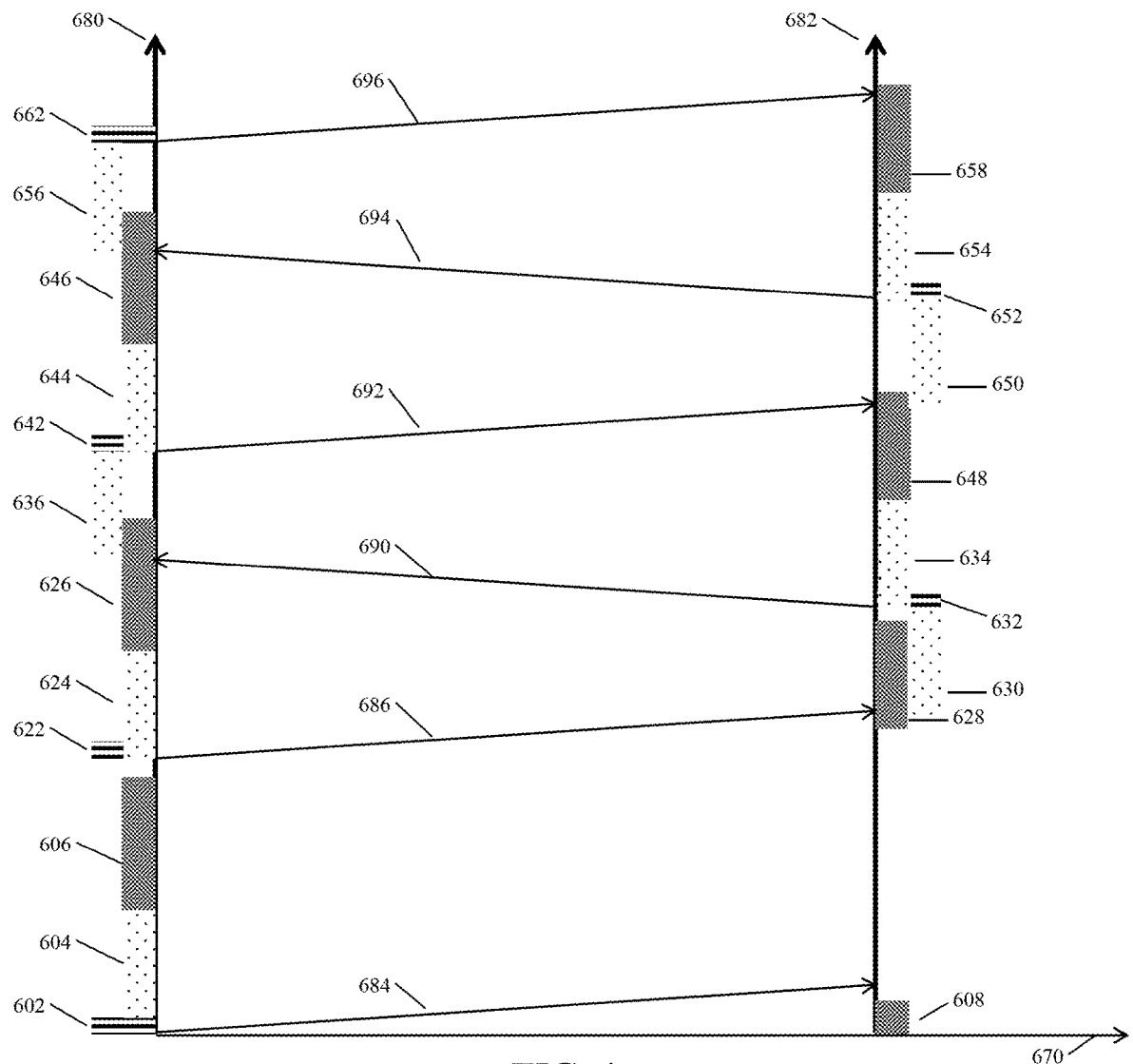
FIG. 4 shows a timing diagram, illustrating the relative timing of a first ultrasonic transceiver and a second ultrasonic transceiver, when operated in a second operating mode.

In another embodiment, an ultrasonic base station 400 and an ultrasonic beacon 406 may be operated such that both the ultrasonic base station 400 and the ultrasonic beacon 406 measure the time-of-flight between ultrasonic base station 400 and ultrasonic beacon 406. Refer now to FIG. 4. Time axis 680 represents the time measured at the ultrasonic base station 400. Ultrasonic beacon position 682 represents the position of the ultrasonic beacon 406 relative to ultrasonic base station 400. At the beginning of the time window shown, ultrasonic base station 400 transmits a pulse 602 which travels 684 to the ultrasonic beacon 406. Ultrasonic beacon 406 has just completed receive phase 608 and does not detect pulse 602. Ultrasonic base station 400 waits reference delay 604 and then does a receive phase 606 in which it does not hear a reply from the ultrasonic beacon 406.

After a certain delay ultrasonic base station 400 repeats the measurement process and sends pulse 622 to ultrasonic beacon 406. The pulse 622 arrives during receive phase 628. Ultrasonic beacon 406 measures the time of arrival of pulse 622 and generates reference delay 630 such that pulse 632 is generated one reference delay after the time of arrival of pulse 622. Pulse 632 travels 690 back to ultrasonic base station 400 which detects it during receive phase 626. The time between the start of receive phase 626 and the time of arrival of pulse 632 is the round-trip time-of-flight between ultrasonic base station 400 and ultrasonic beacon 406. Ultrasonic base station 400 measures the time of arrival of pulse 632 and generates reference delay 636 such that pulse 642 is generated one reference delay after the time of arrival of pulse 632. Pulse 642 travels 692 to ultrasonic beacon 406 which detects it during receive phase 648. The time between the start of receive phase 648 and the time of arrival of pulse 642 is the round-trip time-of-flight between ultrasonic beacon 406 and ultrasonic base station 400. In this way, both the ultrasonic base station 400 and the ultrasonic beacon 406 measure the time-of-flight between ultrasonic base station 400 and ultrasonic beacon 406. Together with the speed of sound this can be used to estimate the range between ultrasonic base station 400 and ultrasonic beacon 406.

In some embodiments, the time-of-flight between several ultrasonic base stations may be used to improve the estimate of the position of ultrasonic beacon 406. Referring now to FIG. 1, ultrasonic base stations 400, 402, 404 may be placed in known positions. The base stations may be used to ultrasonically measure the times-of-flight associated with paths 430, 432, 434 between the base stations 400, 402, 404. They may also be used to measure the times-of-flight associated with paths 420, 422, 424 between base stations 400, 402, 404 and ultrasonic beacon 406. The times-of-flight associated with the one or more known path 430, 432, 434 lengths may then be used to calculate the speed of sound through the acoustic medium. This may be used to accurately determine the position of ultrasonic beacon 406 using the times-of-flight estimates from the paths 420, 422, 424.

In yet other embodiments, the initial location of ultrasonic base stations 402, 404 may be unknown with respect to the location of ultrasonic base station 400. In this case, the base stations may be used to measure times-of-flight associated with paths 430, 432, 434. The times-of-flight may be used to calculate the relative positions of ultrasonic base stations 402, 404 by using an assumed value of the speed of sound, or by estimating the speed of sound based on the current air temperature.

Figure 5:
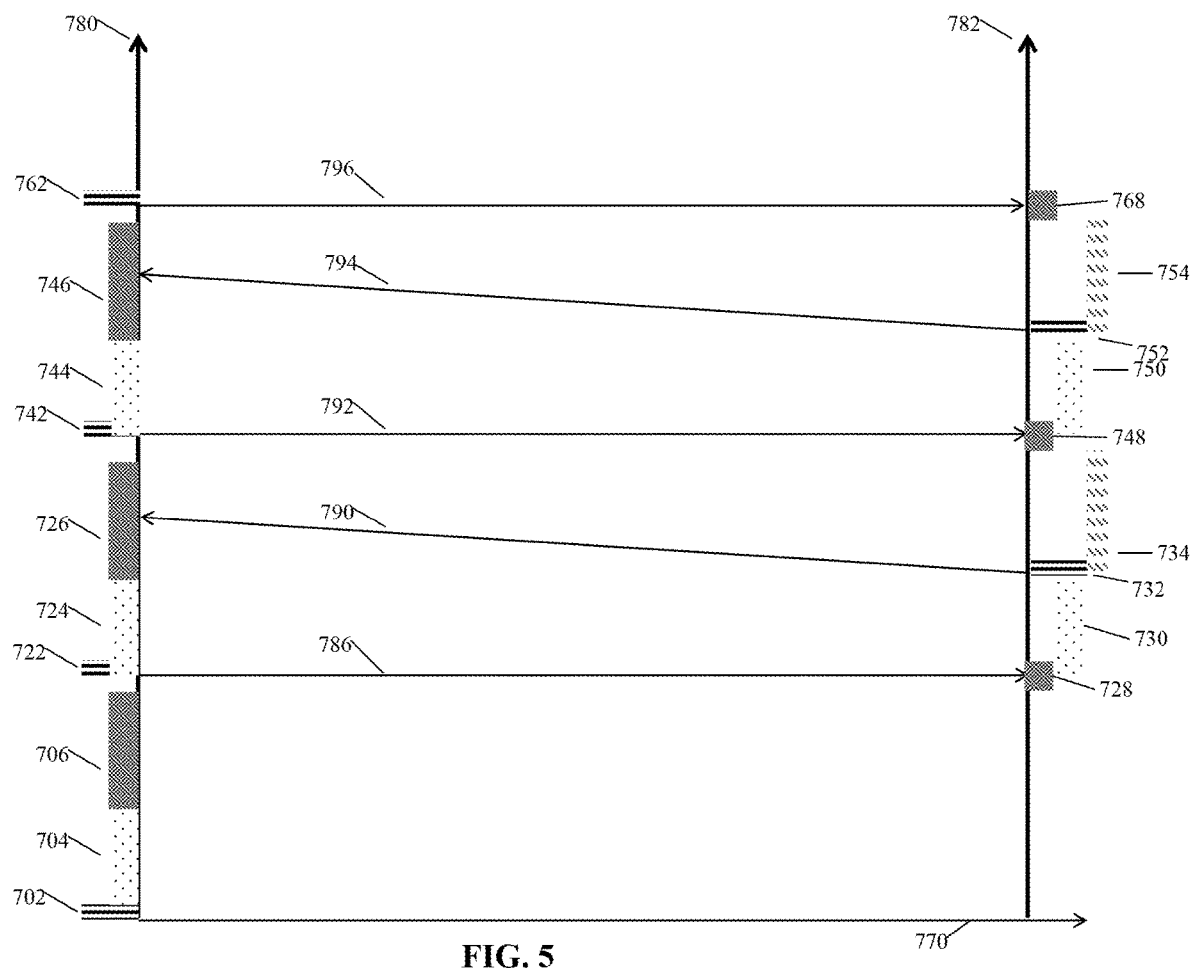
FIG. 5 shows a timing diagram, illustrating the relative timing of a first ultrasonic transceiver and a second ultrasonic transceiver, when operated in a third operating mode.

In other embodiments, the time-of-flight measurement may be performed using an optical or radio channel for one direction of communication. Refer now to FIG. 5. Time axis 780 represents the time measured at the ultrasonic base station 400. Time axis 782 represents the time measured at the ultrasonic beacon 406. At the beginning of the time window shown, ultrasonic base station 400 transmits an electromagnetic trigger pulse 702, e.g., an optical trigger pulse, which travels 784 to the ultrasonic beacon 406. This pulse propagates at the speed of light which means it incurs nearly no delay, which is why path 784 shows a slope of zero. In this example ultrasonic beacon 406 has already concluded the electromagnetic receive phase and so it does not detect the electromagnetic pulse sent by base station 400. Base station 400 repeats the measurement process some time later by sending an electromagnetic pulse 722 which travels 786 to ultrasonic base station 406 where it is detected during electromagnetic receive phase 728. After a reference delay 730, the ultrasonic beacon 400 sends an ultrasonic pulse 732 back 790 to base station 400 which receives it during receive phase 726. The time between the start of receive phase 726 and the time of arrival of pulse 732 is the one-way ultrasonic time-of-flight between ultrasonic base station 400 and ultrasonic beacon 406. In such implementations, the base station 400 may include an electromagnetic transmitter and the beacon 406 may include an electromagnetic receiver. The transmitter and/or receiver may be included, e.g., as part of ultrasonic transceiver 6 in FIG. 3. Examples of electromagnetic transmitters include radio frequency or microwave transmitters, light sources, e.g. light emitting diodes, lasers, and incandescent lights, and the like. Examples of electromagnetic receivers include radio frequency or microwave antennas, photodiodes, photovoltaic devices, and the like. Electromagnetic trigger pulses may be in the form of radio frequency, microwave, terahertz, infrared, visible, ultraviolet or other forms of radiation within the electromagnetic spectrum. For infrared, visible, and ultraviolet radiation, the term "optical trigger pulse" is sometimes used herein.

In other embodiments, the ultrasonic base station 400 may transmit an acoustic pulse and the ultrasonic beacon 406 may reply with an electromagnetic pulse.

Figure 6:
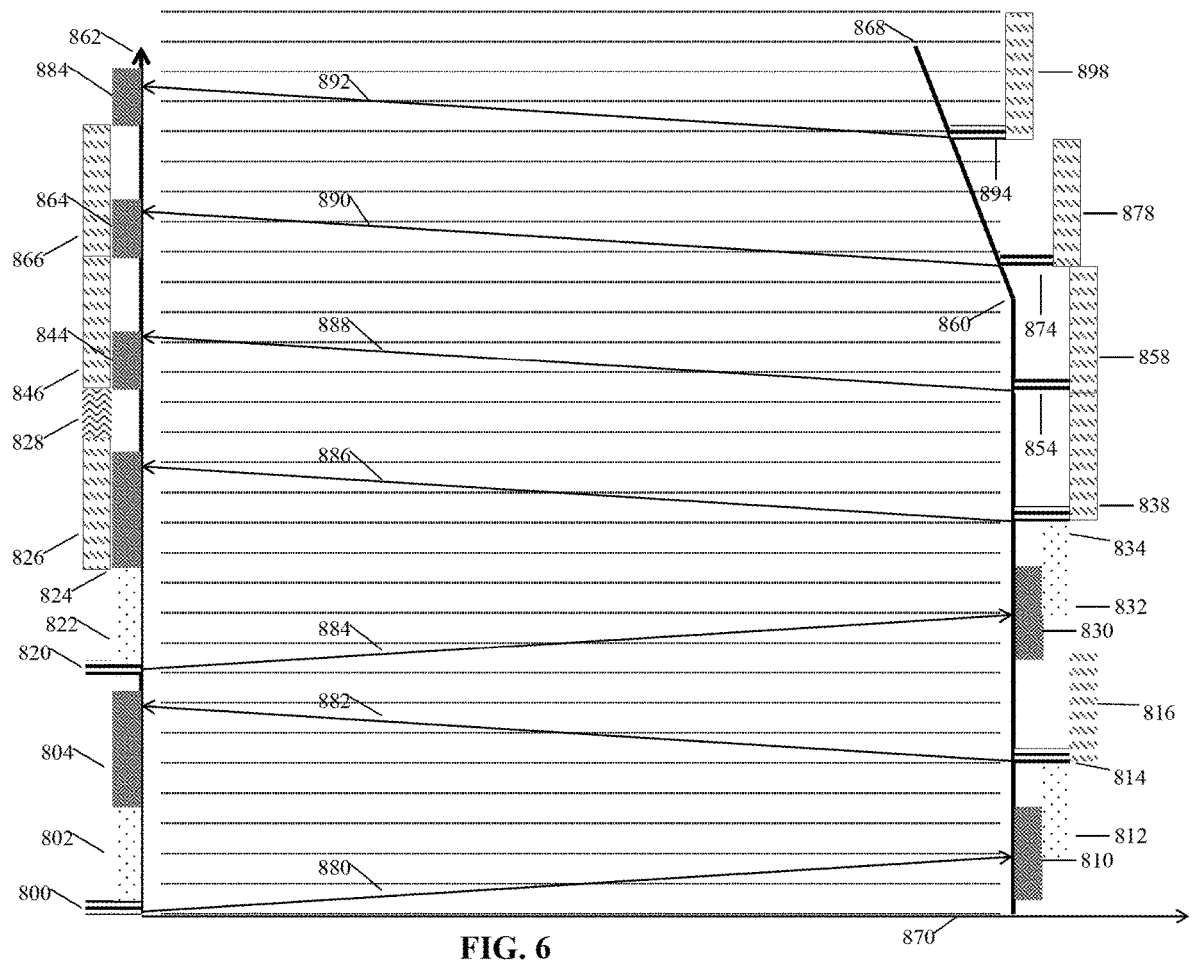
FIG. 6 shows a timing diagram, illustrating the relative timing of a first ultrasonic transceiver and a second ultrasonic transceiver, when operated in a fourth operating mode.

In some embodiments, a different operating mechanism may be used after synchronization is completed. Refer now to FIG. 6. A timing diagram is shown. Axis 862 represents time as measured on ultrasonic base station 400. Axis 870 is the range axis. Ultrasonic beacon position 868 represents the position of the ultrasonic beacon 406 relative to ultrasonic base station 400. Ultrasonic beacon position 868 is curved because at initial move time 860 ultrasonic beacon 406 begins to move towards ultrasonic base station 400, thus decreasing the range 870 between them.

At the lower left of FIG. 6, ultrasonic base station 400 is in a synchronized state with ultrasonic beacon 406, following the conclusion of a synchronization procedure such as the one illustrated in FIG. 2. Ultrasonic base station 400 transmits pulse 800 which travels 880 to beacon 400 where it is received during receive phase 810. Beacon 406 sends a pulse 814 back one reference delay 812 after receiving the pulse 800. Pulse 814 arrives at ultrasonic base station 400 during receive phase 804 after reference delay 802, and the time of arrival compared to the beginning of receive phase 804 is the round trip time of flight between base station 400 and beacon 406.

During the second measurement, ultrasonic base station 400 may send a data packet to ultrasonic beacon 406 in pulse 820 which indicates that a one-way measurement state is to be entered for a certain number of samples. Alternately, a one-way measurement state may be initiated a fixed number of cycles after synchronization is completed. Pulse 820 arrives at beacon 406 during receive phase 830, and beacon 406 waits reference delay 832 before sending transmission 834 which travels 886 to base station 400. This transmission 834 may contain data indicating that a one-way measurement state will be entered subsequently. The ultrasonic base station 400 receives pulse 834 during receive phase 824. The ultrasonic base station 400 may wait a reference delay 826 from the beginning of receive phase 824, and then an additional delay 828 before starting the next receive phase 844. During this time, ultrasonic beacon 406 may wait a reference delay from start of transmit phase 834 before sending transmit pulse 854 which travels 888 to ultrasonic base station 400 and arrives during receive cycle 844. Additional delay 828 may be selected such that it is equal to half of the time delay measured in receive cycle 824, in which case the perceived time of arrival of pulse 854 during receive phase 864 will be equal to the one-way time-of-flight between ultrasonic beacon 406 and ultrasonic base station 400, plus any differences between reference delays 826 and 838 and plus the error between the actual time-of-flight during receive phase 824 and the measured time of flight during that time.

At time 860, ultrasonic beacon 406 begins moving towards ultrasonic base station 400 with a constant velocity. As a result, transmit pulses 874, 894 take less time to travel 890, 892 so that the time of arrival recorded by ultrasonic base station 400 is shortened. The time between the beginning of receive periods 864, 884 and the arrival of pulses 874, 894 is equal to the one-way time of flight between ultrasonic beacon 406 and base station 400, which is decreasing over time.

To minimize the errors generated by mismatches in base station 400 reference delays 826, 846, 866 and beacon 406 reference delays 838, 858, 878, a crystal, microelectromechanical, or electronic oscillator may be used. The oscillators may be trimmed to a reference or to each other using a calibration procedure.

For example, if the base station 400 oscillator and the beacon 406 oscillator have a long term period jitter of 10 ppm, a drift of in the measured one-way time delay equal to 10 ppm of the measurement period may be observed in each measurement for a stationary beacon 406. For a measurement period on the order of 10 ms, a drift of 100 ns per measurement would be expected. In air this corresponds to a drift of 34 microns per measurement, or 3.4 mm per second. To correct the random jitter or small frequency differences, a periodic re-synchronization may be used. In some embodiments, if the frequency offset between base station 400 and beacon 406 is fixed, the beacon may communicate its reference frequency to the base station. This avoids the need to resynchronize because of a constant frequency offset. The base station 400 and beacon 406 may count a specific number of measurements after which the base station 400 and beacon 406 enter a re-synchronization state. In a re-synchronization state, base station 400 may send a transmission to beacon 406 which has also entered a synchronization state which begins with a receiving state. After receiving a pulse from base station 400, beacon 406 will wait one reference delay before transmitting a reply. Base station 400 and beacon 406 may exchange several pulses during the re-synchronization procedure. At completion of the synchronization procedure, base station 400 and beacon 406 may re-enter a one-way transmission state.

Alternately, a re-synchronization state may be entered when beacon 406 sends data encoded into the one-way transmission pulse to base station 400 which indicates that base station 400 should subsequently enter a re-synchronization state. In other systems, beacon 406 may include a short receive phase prior to transmit phases 834, 854, 874 where beacon 406 listens for a pulse from base station 400, which may include data which indicates that beacon 406 should subsequently enter a re-synchronization state. In either case, after the first transceiver indicates the beginning of a re-synchronization state, both transceivers begin a re-synchronization state which completes when the transceivers are synchronized.

Figure 7:
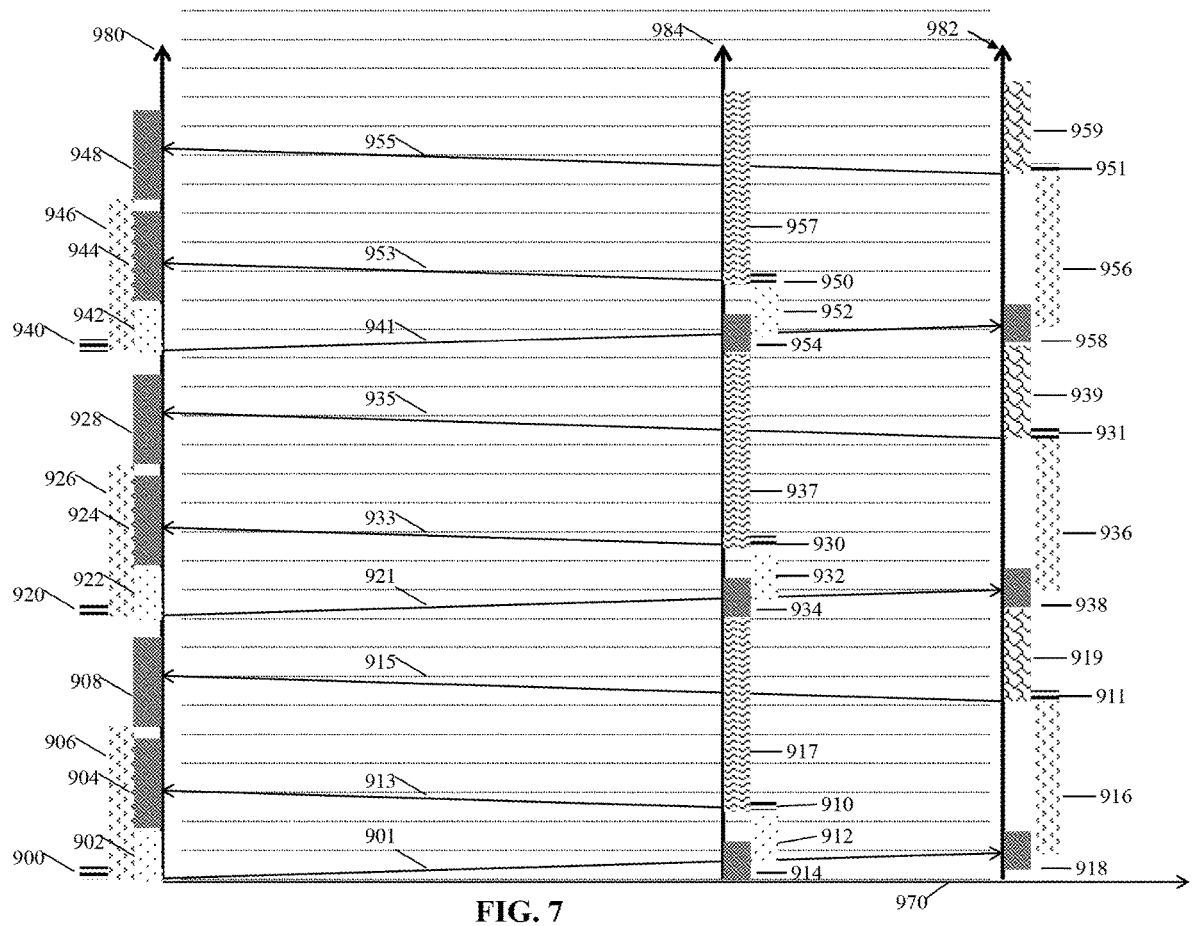
FIG. 7 shows a timing diagram, illustrating the relative timing of a first ultrasonic transceiver, a second ultrasonic transceiver, and a third ultrasonic transceiver, when operated in a fifth operating mode.

In some embodiments, multiple beacons 406 may be tracked by base stations 400. Refer to FIG. 7. A timing diagram is shown. Axis 980 represents time as measured on ultrasonic base station 400. Axis 970 is the range axis. Ultrasonic beacon position 984 represents the position of a first ultrasonic beacon 406 relative to ultrasonic base station 400. Ultrasonic beacon position 982 represents the position of a second ultrasonic beacon 407 relative to ultrasonic base station 400.

In this example, ultrasonic beacons 406, 407 have synchronized to base station 400 prior to the beginning of the illustration. Synchronization may have been performed using a technique described elsewhere in this disclosure. At the beginning of the first measurement, ultrasonic base station 400 sends a transmission 900 which travels along path 901 to first beacon 406 and second beacon 407. First beacon 406 receives transmission 900 during receive phase 914. First beacon 406 generates reference delay 912 and transmits a pulse 910 back to base station 400 after one reference delay 912 has elapsed since the time-of-arrival of transmission 900. First beacon 406 then waits for an adjustable time delay 917, which may be adjusted using a feedback controller which forces the arrival time of transmissions 900, 920, 940 to arrive during the center of receive phases 914, 934, 954.

Second beacon 407 receives transmission 900 during receive phase 918. Second beacon 407 generates reference delay 916 and transmits a pulse 911 back to base station 400 after one reference delay 916 has elapsed since the time-of-arrival of transmission 900. Second beacon 407 then waits for an adjustable time delay 919, which may be adjusted using a feedback controller which forces the arrival time of transmissions 900, 920, 940 to arrive during the center of receive phases 918, 938, 958. Base station 400 may generate a reference delay 902 and then commence receive period 904 one reference delay 902 after the beginning of transmit 900. If reference delay 902 is substantially equal to reference delay 912, then the time-of-arrival of pulse 910 during receive phase 904 will indicate the round-trip time-of-flight between base station 400 and beacon 406. Similarly, base station 400 may generate reference delay 906 and then commence receive period 908 one reference delay 906 after the beginning of transmit 900. If reference delay 906 is substantially equal to reference delay 916, then the time-of-arrival of pulse 911 during receive phase 908 will indicate the round-trip time-of-flight between base station 400 and beacon 407. After the conclusion of receive phase 908, base station 400 may send transmission 920 to commence the second measurement cycle.

Several practical implementation details are now discussed. Reference delay 902 may be chosen to be as short as possible while allowing enough time for beacon 406 to receive and process receive phase 914. Reference delay 906 may be chosen to be equal to the length of reference delay 902 plus the time required for base station 400 to receive and process receive phase 906.

In some embodiments, a second transmit phase may be inserted between receive phase 904 and receive phase 908 on base station 400. In these embodiments, each transmit pulse may consist of several transmit symbols. Each symbol may have an arbitrary phase or amplitude which may be used to encode a code in the symbol. The first transmit pulse may contain a different code than the second transmit pulse. Beacon 406 may be configured to respond to a transmit pulse only if it contains a specific code. Beacon 407 may be configured to respond to a different code. Base station 400 may then use a first transmit phase to signal to beacon 406 and a second transmit phase to signal to beacon 407. In these embodiments, reference delay 906 may be substantially equal to reference delay 902. The first transmit phase may be encoded to signal a first beacon 406 while the first receive phase may be timed to receive the transmission from a second beacon 407. The second transmit phase may be encoded to signal second beacon 407 while the second receive phase may be timed to receive the transmission from first beacon 406. In this way, the measurements of the positions of beacons 406, 407 may be interleaved.

In yet a different embodiment, a single transmit phase may be used. Beacon 406 and beacon 407 may respond after substantially equal reference time delays 912, 916. Beacon 406 and beacon 407 may encode their transmit pulses to indicate which transmit pulse originated from which unit. In such an embodiment, ultrasonic base stations 400,402,404 may contain dictionaries of saved waveforms from ultrasonic beacons 406. The base stations 400,402,404 may compare received signals with saved waveforms through matched filtering or convolutional techniques. In a case where a received signal does not match any saved waveform in the dictionary, the presence of a new ultrasonic beacon 406 may be inferred, and the corresponding signal saved in the dictionary.

In some embodiments, the techniques disclosed here may be extended to an arbitrary number of beacons and/or base stations which may be synchronized electronically or which may be synchronized ultrasonically. In some embodiments, a central computer or server may be used to schedule time slots for nearby beacons or base stations. In such an embodiment, a base station may inventory nearby beacons and base stations through use of a unique identification code for each beacon or base station, and record the identification code and range for each nearby unit. The base station may then transmit the inventory of identification codes and ranges to the central computer or server, which may use inventories from other nearby base stations to construct a schedule of time slots for each of the base stations and beacons. The central computer or server may then transmit the schedule to each base station and/or beacon, which may then execute the schedule.

Figure 8:
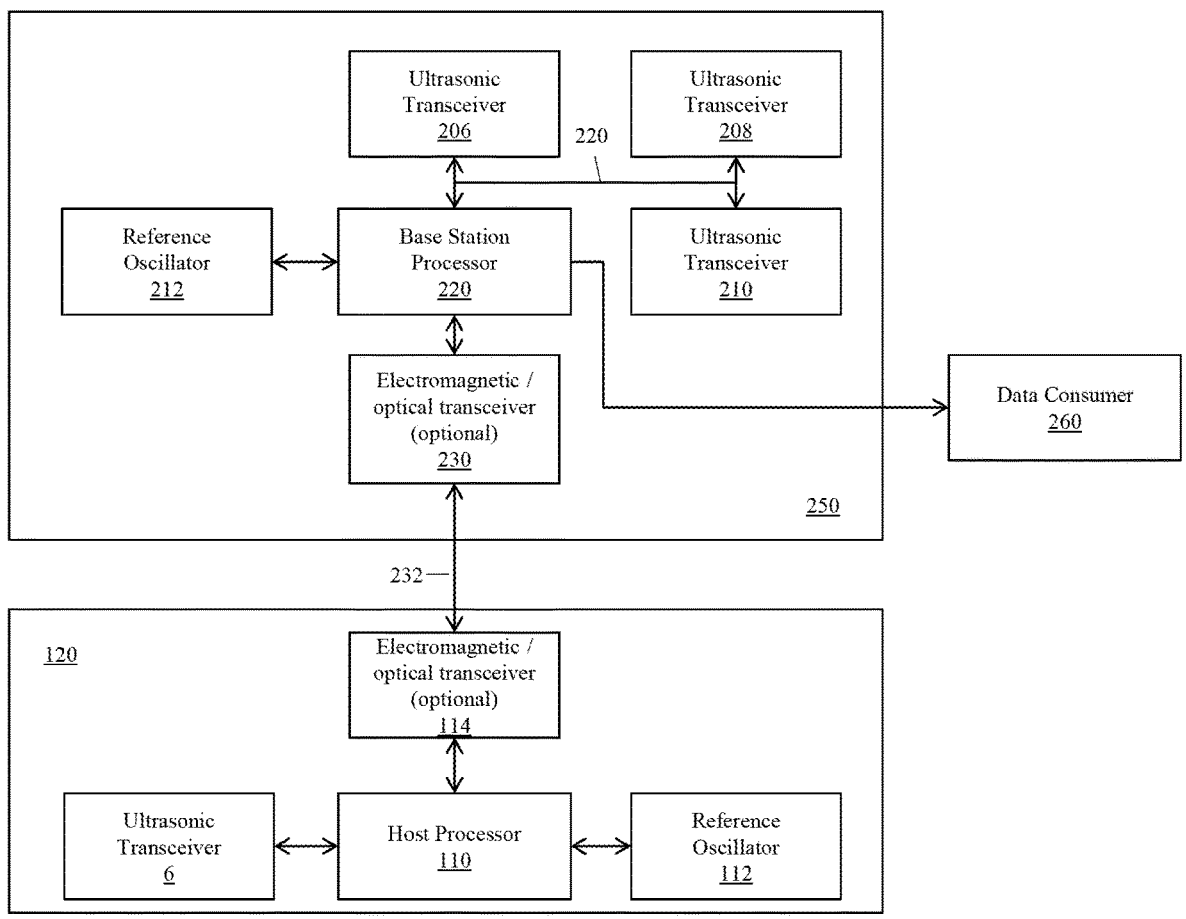
FIG. 8 shows a schematic diagram of an ultrasonic base station and an ultrasonic beacon, connected through a radio link.

Referring to FIG. 8, in one implementation, a base station module 250 contains a base station processor 220, reference oscillator 212, radio 230, and ultrasonic transceivers 206, 208, 210 connected through sensor bus 220. Base station processor 220 and reference oscillator 212 may be used to correct the clocks contained in transceivers 206, 208, 210. Base station processor 220 may also be used to configure ultrasonic transceivers 206, 208, 210 to perform time-of-flight measurements to ultrasonic beacon 120. Base station processor 220 may use the recorded times-of-flight from transceivers 206, 208, 210 to generate an estimate of the x, y, z position of beacon 120 and transmit this information to data consumer 260.

Ultrasonic beacon 120 may contain a host processor 110 and reference oscillator 112 which is used to correct the clock contained in transceiver 6. Electromagnetic/optical transceiver 114 and electromagnetic/optical transceiver 230 may establish an electromagnetic or optical link 232 which could be used for sending an electromagnetic synchronization pulse. The electromagnetic/optical link 232 could also be used for data communication between ultrasonic base station 250 and ultrasonic beacon 120. This data communication could allow settings such as the sample period to be changed on the ultrasonic beacon 120.

Although the language used in this disclosure referred extensively to ultrasonic base station 400 and ultrasonic beacon 406, it will be clear to a person skilled in the art that there is no implied preferred frame of reference, and that in some systems, ultrasonic base station 400 may be moving, while ultrasonic beacon 406 is stationary, while in other systems, both ultrasonic base station 400 and ultrasonic beacon 406 may be moving with respect to a third observer. It is also in no way implied that ultrasonic base station 400 and ultrasonic beacon 406 are constructed of different hardware or even different software, and in some instances a system which was used as a beacon 406 may be reconfigured to operate as a base station 400, and vice versa.

By way of example, refer to FIG. 1. In some embodiments, radios or wired connections may be used to transfer data from ultrasonic base stations 400,402,404 in order to collect the measured ranges from base stations 400,402,404 such that the position of ultrasonic beacon 406 may be calculated. However, in some embodiments, an alternative scheme which requires fewer wireless or wired connections may be used.

In one embodiment, ultrasonic beacon 406 may be configured in a base station operating mode while ultrasonic base stations 400,402,404 are configured in beacon operating modes. Ultrasonic beacon 406 may emit ultrasonic trigger pulses at regular intervals. Ultrasonic base stations 400,402,404 may synchronize ultrasonically to ultrasonic beacon 406, and transmit return pulses after reference delay (s). In this way, ultrasonic beacon 406 may measure the ranges between base stations 400,402,404 and ultrasonic beacon 406. If the positions of base stations 400,402,404 are known with respect to each other in a certain frame of reference, the ranges between base station 400,402,404 and ultrasonic beacon 406 may be used to calculate the position of ultrasonic beacon 406. In some embodiments, this may be a desired feature, for example when ultrasonic beacon 406 is connected to a computer, phone, virtual reality headset, or other device which uses the calculated position of ultrasonic beacon 406 to estimate a position of the device. As a result, no wired or wireless connections other than the ultrasonic link may exist between base stations 400,402,404 in some embodiments.

In some implementations, ultrasonic beacon 406 or ultrasonic base station 400 may be also operated in a pulse-echo mode. In this mode, ultrasonic beacon 406 or base station 400 may operate in the an operating mode disclosed above, except that in each case where beacon 406 or base station 400 finishes a transmit state, beacon 406 or base station 400 may subsequently enter a pulse echo receive state, wherein echoes from the transmit state are detected by beacon 406 or base station 400, and the time arrival and/or intensity of the echoes are used to infer the range to the reflecting surface.

In some implementations, ultrasonic base stations 400, 402,404 may measure the frequency of the received signal from ultrasonic beacon 406. The frequency may be used to estimate the relative radial velocity of ultrasonic beacon 406 with respect to base stations 400,402,404. The relative velocity signals together with the position data may be used to improve the estimate of the position and velocity of ultrasonic beacon 406.

In some implementations, the field of view provided by a first set of ultrasonic base stations 400,402,404 may be insufficient due to the arrangement, acoustic emission pattern, or mounting of ultrasonic base stations 400,402,404 and the expected range of motion of ultrasonic beacon 406. In these cases, additional ultrasonic base stations may be used. In particular, multiple master ultrasonic base stations 400 may be used. These base stations 400 may be synchronized electronically, ultrasonically, optically, or electromagnetically, and may send trigger pulses to ultrasonic beacon(s) 406. The trigger pulses from multiple base stations 400 may be sent substantially simultaneously, or during separate time slots. In some cases, the ultrasonic beacon(s) 406 may be operated in base station operating modes while the ultrasonic base stations are operated in beacon operating modes. In this case, ultrasonic beacon(s) 406 may calculate their own position when three or more ultrasonic base stations 400 are within the field of view of ultrasonic beacon(s) 406.

In some embodiments, the field of view provided by an ultrasonic beacon 406 may be insufficient due to the mounting or acoustic emission pattern of ultrasonic transceiver 6 within ultrasonic beacon 406. In this case, ultrasonic beacon 406 may include two or more transceivers 6. Refer for example to FIG. 2. The two transceivers may be operated such that both transceivers on ultrasonic beacon perform receive phases 528, 548, 568. The transceivers may then compare the relative signal level of received transmissions 522, 542, 562. The transceiver with the largest relative signal level may perform reply transmission 532, 552. The comparison may be performed through use of a central processor or by designation of one of transceivers 6 as the master unit. In some cases, particularly when transceivers 6 are far apart, synchronization may be performed separately on the two transceivers, and only the decision on which transceiver 6 will send a reply transmission will be taken together. In these cases, data contained within the reply transmission may encode which transceiver 6 sent the reply pulse.

It is noted that aspects of the present disclosure include implementations in which three-dimensional location information for a transceiver may be determined. For example, for example, if in addition to the base station, two or more additional transceivers receive the ultrasonic reply pulse from the beacon, from the known positions of the base station and the two or more additional transceivers and the relative times-of-arrival of the ultrasonic reply pulse, a three-dimensional location of the beacon may be determined.

Although the description herein contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art. For example, while circular embodiments are shown, the acoustic array elements may have many different shapes such as square, rectangular, hexagonal, octagonal, and so on. All such variations that would be apparent to one of ordinary skill in the art are intended to fall within the scope of this disclosure. It will also be appreciated that the drawings are not necessarily to scale, with emphasis being instead on the distinguishing features of the device disclosed herein.

All cited references are incorporated herein by reference in their entirety. In addition to any other claims, the applicant(s)/inventor(s) claim each and every embodiment of the invention described herein, as well as any aspect, component, or element of any embodiment described herein, and any combination of aspects, components or elements of any embodiment described herein.

What is claimed is:

1. A method for determining a distance between a first transceiver and a second transceiver, the method comprising determining the time elapsed from a start time to a receive time:
    wherein the first transceiver is duty cycled, having a receive period which is less than a measurement period, wherein the first transceiver is configured to receive transmissions during the receive period, wherein the measurement period is a time between subsequent transmissions from the second transceiver,
    wherein an ultrasonic trigger pulse transmitted by the second transceiver is used to indicate the start time to the first transceiver,
    wherein, at the start time, which is known to the first transceiver and the second transceiver, the first transceiver transmits an ultrasonic response pulse;
    subsequently, the second transceiver receives the ultrasonic pulse and determines the receive time of the ultrasonic response pulse; and
    the second transceiver determines the distance between the first transceiver and the second transceiver from the elapsed time,
    wherein a start time of a subsequent receive period is adjusted based on a time of arrival of the trigger pulse in a current receive period, causing the trigger pulse to arrive at a desired time during the subsequent receive period.

2. The method of claim 1, in which:
    the first transceiver, upon receiving the ultrasonic trigger pulse, immediately transmits the ultrasonic response pulse;
    the second transceiver calculates the time-of-flight based on the time elapsed between the transmission of the ultrasonic trigger pulse and the reception of the ultrasonic response pulse.

3. The method of claim 1, in which:
    the first transceiver, upon receiving the ultrasonic trigger pulse, waits a reference time delay and then transmits the ultrasonic response pulse;
    the second transceiver calculates the time-of-flight by subtracting the reference delay from the time elapsed between the transmission of the ultrasonic trigger pulse to the reception of the ultrasonic response pulse.

4. The method of claim 3, wherein the ultrasonic response pulse is encoded by the first transceiver so that the second transceiver can differentiate pulses from multiple transceivers.

5. The method of claim 3, wherein three or more transceivers are used and:
    the second transceiver sends an ultrasonic trigger pulse;
    the other transceivers each respond after unique predetermined reference delays;
    the second transceiver calculates the time-of-flight by subtracting the corresponding predetermined reference delays from the time elapsed between the transmission of the ultrasonic trigger pulse and the reception of the corresponding ultrasonic response pulses.

6. The method of claim 3, wherein:
    in addition to the second transceiver, one or more additional transceivers receive the ultrasonic reply pulse;
    from the known positions of the second transceiver and the one or more additional transceivers and the relative times-of-arrival of the ultrasonic reply pulse, a two-dimensional location of the first transceiver is determined.

7. The method of claim 1, in which a feedback controller is used to adjust the start time of the subsequent receive period.

8. The method of claim 1, in which during a synchronization process:
    the second transceiver transmits a first ultrasonic trigger pulse;
    the first transceiver, upon receiving the first ultrasonic trigger pulse, immediately transmits an ultrasonic response pulse;
    the second transceiver, upon receiving the ultrasonic response pulse, calculates the round-trip time-of-flight from the time delay between the transmission of the first ultrasonic trigger pulse and the reception of the ultrasonic response pulse;
    after a desired measurement period has elapsed since the transmission of the first ultrasonic pulse, the second transceiver transmits a second ultrasonic trigger pulse;
    the first transceiver, upon receiving the second ultrasonic trigger pulse, immediately transmits an ultrasonic response pulse, calculates the desired measurement period from the elapsed time between the reception of the first ultrasonic trigger pulse and the reception of the second ultrasonic trigger pulse, and subsequently transmits ultrasonic response pulses at the desired measurement period.

9. The method of claim 1, wherein the ultrasonic reply pulse is encoded by the first transceiver so that the second transceiver can differentiate pulses from multiple transceivers.

10. The method of claim 1, wherein the ultrasonic response pulse is encoded by the first transceiver so that the second transceiver can differentiate pulses from multiple transceivers.

11. The method of claim 1, wherein:
in addition to the second transceiver, two or more additional transceivers receive the ultrasonic reply pulse;
from the known positions of the second transceiver and the two or more additional transceivers and the relative times-of-arrival of the ultrasonic reply pulse, a three-dimensional location of the first transceiver is determined.

12. The method of claim 3, wherein:
in addition to the second transceiver, two or more additional transceivers receive the ultrasonic reply pulse;
from the known positions of the second transceiver and the two or more additional transceivers and the relative times-of-arrival of the ultrasonic reply pulse, a three-dimensional location of the first transceiver is determined.

13. The method of claim 4, wherein:
in addition to the first transceiver, two or more additional transceivers transmit coded ultrasonic reply pulses;
from the known positions of the first transceiver and the two or more additional transceivers and the relative times-of-arrival of the ultrasonic reply pulses, a three-dimensional location of the second transceiver is determined.

14. The method of claim 5, wherein:
three or more transceivers each respond after unique predetermined reference delays;
the second transceiver calculates the time-of-flight by subtracting the corresponding predetermined reference delays from the time elapsed between the transmission of the ultrasonic trigger pulse and the reception of the corresponding ultrasonic response pulses;
from the known positions of the other transceivers and the relative times-of-arrival of the ultrasonic reply pulses, a three-dimensional location of the second transceiver is determined.

* * * * *